(12) United States Patent
Tabuchi

(10) Patent No.: US 10,802,244 B2
(45) Date of Patent: Oct. 13, 2020

(54) METHODS AND APPARATUS FOR FOCUS CONTROL IN AN IMAGING SYSTEM

(71) Applicant: SEMICONDUCTOR COMPONENTS INDUSTRIES, LLC, Phoenix, AZ (US)

(72) Inventor: Yoshihisa Tabuchi, Gifu (JP)

(73) Assignee: SEMICONDUCTOR COMPONENTS INDUSTRIES, LLC, Phoenix, AZ (US)

(*) Notice: Subject to any disclaimer, the term of this patent is extended or adjusted under 35 U.S.C. 154(b) by 77 days.

(21) Appl. No.: 16/185,180

(22) Filed: Nov. 9, 2018

(65) Prior Publication Data

US 2019/0079265 A1 Mar. 14, 2019

Related U.S. Application Data

(63) Continuation-in-part of application No. 15/788,006, filed on Oct. 19, 2017, now Pat. No. 10,162,149.

(60) Provisional application No. 62/527,540, filed on Jun. 30, 2017.

(51) Int. Cl.
*G02B 7/28* (2006.01)
*G02B 7/09* (2006.01)
*G02B 7/02* (2006.01)
*H04N 5/232* (2006.01)

(52) U.S. Cl.
CPC ............. *G02B 7/28* (2013.01); *G02B 7/028* (2013.01); *G02B 7/09* (2013.01); *H04N 5/23258* (2013.01)

(58) Field of Classification Search
CPC . G02B 7/028; G02B 7/09; G02B 7/28; H04N 5/23212; H04N 5/23258

USPC ......................................................... 348/350
See application file for complete search history.

(56) References Cited

U.S. PATENT DOCUMENTS

| | | | |
|---|---|---|---|
| 4,982,216 A * | 1/1991 | Kudo | G02B 7/28 396/97 |
| 5,208,625 A | 5/1993 | Suekane | |
| 6,268,885 B1 | 7/2001 | Ohta | |
| 8,830,335 B2 | 9/2014 | Topliss | |
| 9,883,098 B2 | 1/2018 | Park | |
| 9,888,164 B1 | 2/2018 | Cui | |
| 9,930,223 B2 | 3/2018 | Park | |
| 9,942,462 B2 | 4/2018 | Park | |
| 10,277,799 B2 * | 4/2019 | Abe | H04N 5/232122 |
| 2008/0212955 A1 | 9/2008 | Kikuchi | |
| 2010/0067130 A1 | 3/2010 | Kim | |
| 2011/0019109 A1 * | 1/2011 | Maeda | H04N 9/317 348/745 |

(Continued)

*Primary Examiner* — Pritham D Prabhakher
(74) *Attorney, Agent, or Firm* — The Noblitt Group, PLLC; Hettie L. Haines

(57) ABSTRACT

Various embodiments of the present technology may comprise methods and apparatus for focus control in an imaging system. The methods and apparatus may comprise various circuits and/or systems configured to measure the ambient temperature of the lens module and compute a corrected target position based on known thermal characteristics of the lens and/or the lens barrel. Factors used to obtain the corrected target position may comprise the material the of the lens barrel, the thermal time constant of the lens barrel, the linear expansion coefficient of the lens barrel, the effective focal length (EFL) of the lens, the thermal response of the lens, and/or the temperature characteristic coefficient of the EFL.

20 Claims, 13 Drawing Sheets

(56) References Cited

U.S. PATENT DOCUMENTS

| | | | |
|---|---|---|---|
| 2014/0043701 A1* | 2/2014 | Motomura | B41J 2/155 359/811 |
| 2014/0168383 A1* | 6/2014 | Murakami | G02B 7/09 348/47 |
| 2014/0233109 A1 | 8/2014 | Nakano | |
| 2016/0113517 A1* | 4/2016 | Lee | H04M 1/72522 600/474 |
| 2016/0320585 A1 | 11/2016 | Park | |
| 2016/0373718 A1* | 12/2016 | Bustin | G02B 7/08 |
| 2017/0031128 A1 | 2/2017 | Liu | |
| 2017/0054884 A1 | 2/2017 | Leu | |
| 2017/0109889 A1* | 4/2017 | Yun | H04N 5/23212 |
| 2017/0150126 A1* | 5/2017 | Kim | H04N 5/2257 |
| 2017/0264813 A1 | 9/2017 | Park | |
| 2017/0343765 A1* | 11/2017 | Maruyama | G02B 7/023 |
| 2017/0359501 A1* | 12/2017 | Abe | H04N 5/23216 |
| 2018/0017757 A1* | 1/2018 | Bohn | G02B 3/12 |
| 2018/0149826 A1* | 5/2018 | Lei | G03B 13/36 |
| 2018/0176451 A1 | 6/2018 | Asuncion | |

* cited by examiner

METHODS AND APPARATUS FOR FOCUS CONTROL IN AN IMAGING SYSTEM

CROSS-REFERENCE TO RELATED APPLICATION

This application is a continuation-in-part of U.S. patent application Ser. No. 15/788,006, filed on Oct. 19, 2017, which claims the benefit of U.S. Provisional Patent Application Ser. No. 62/527,540, filed on Jun. 30, 2017, and incorporates the disclosure of the application in its entirety by reference.

BACKGROUND OF THE TECHNOLOGY

Electronic devices, such as cellular telephones, cameras, and computers, commonly use a lens module, comprising a lens and a lens barrel, in conjunction with an image sensor to capture images. Many imaging systems employ autofocus methods and various signal processing techniques to improve image quality by adjusting the position of the lens relative to the image sensor.

Autofocus systems generally employ an actuator to move the lens module to an optimal position to increase the image quality. In operation, heat generated by the image sensor and/or the control circuit, as well as heat from an external source, may increase the ambient temperature of the lens module. Changes in the ambient temperature may cause components, such as the lens barrel and the lens, to contract or expand. This may cause the position of the lens, relative to the image sensor, to deviate from the optimal position resulting in an out-of-focus image.

SUMMARY OF THE INVENTION

Various embodiments of the present technology may comprise methods and apparatus for focus control in an imaging system. The methods and apparatus may comprise various circuits and/or systems configured to measure the ambient temperature of the lens module and compute a corrected target position based on known thermal characteristics of the lens and/or the lens barrel. Factors used to obtain the corrected target position may comprise the material the of the lens barrel, the thermal time constant of the lens barrel, the linear expansion coefficient of the lens barrel, the effective focal length (EFL) of the lens, the thermal response of the lens, and the temperature characteristic coefficient of the EFL.

BRIEF DESCRIPTION OF THE DRAWINGS

A more complete understanding of the present technology may be derived by referring to the detailed description when considered in connection with the following illustrative figures. In the following figures, like reference numbers refer to similar elements and steps throughout the figures.

DETAILED DESCRIPTION OF EXEMPLARY EMBODIMENTS

The present technology may be described in terms of functional block components and various processing steps. Such functional blocks may be realized by any number of components configured to perform the specified functions and achieve the various results. For example, the present technology may employ various types of actuators, image sensors, position sensors, temperature sensors, and the like, which may carry out a variety of functions. In addition, the present technology may be practiced in conjunction with any number of applications, and the apparatus described is merely one exemplary application for the technology. Further, the present technology may employ any number of conventional techniques for performing various computations, processing image data, and the like.

Figure 1:
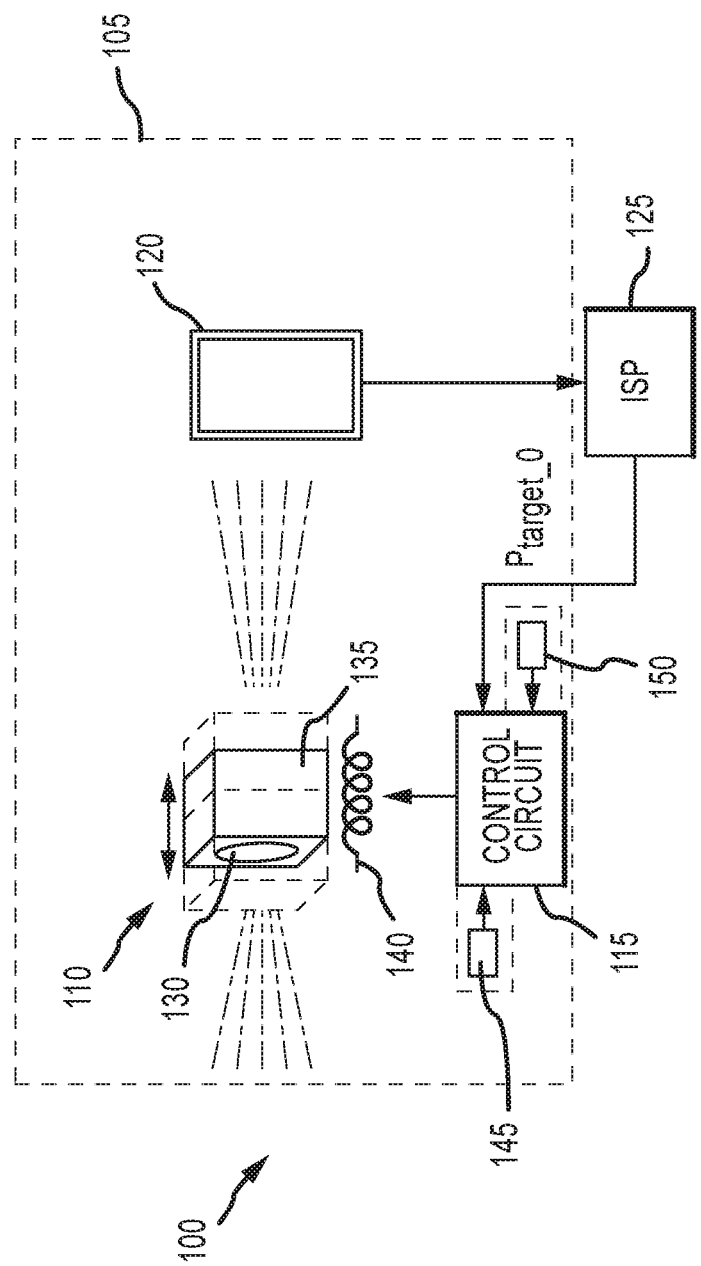
FIG. 1 is a block diagram of an autofocus system in accordance with an exemplary embodiment of the present technology.

The present technology may be used in conjunction with any suitable electronic device or system, such as a digital camera, smartphone, laptop, portable device, and the like. Referring now to FIG. 1, in an exemplary embodiment of the present technology, an imaging system 100 is capable of performing automatic focus (autofocus). According to an exemplary embodiment, and to improve the autofocus function, the imaging system 100 is configured to predict the individual thermal response of various components according to an ambient temperature T and compute a position shift value $P_{SFT}$ (i.e., a magnitude of position shift) and a corrected target position $P_{TARGET\_COR}$ according to the thermal responses of various components. The imaging system 100 may comprise any suitable device and/or system configured to focus an image on a sensing surface and capture image data. For example, in an exemplary embodiment, the imaging system 100 may comprise a camera module 105 and an image signal processor (ISP) 125.

The camera module 105 may capture image data and perform various operating functions, such as autofocus and/or optical image stabilization. The camera module 105 may comprise a lens assembly 110, an image sensor 120 to capture image data, an actuator 140 configured to move the lens assembly 110, and a control circuit 115. According to various embodiments, the camera module 105 further comprises a housing (not shown) that either partially or entirely encases the lens assembly 110, the image sensor 120, and the control circuit 115. According to various embodiments, the camera module 105 may further comprise one or more springs (not shown) connecting the lens assembly 110 to the housing.

Figure 5B:
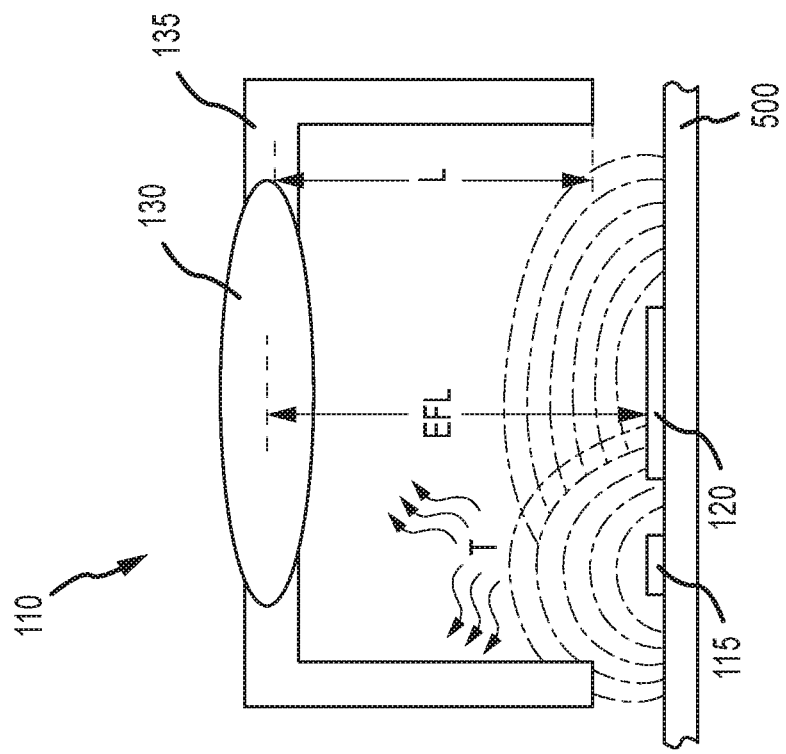
FIGS. 5A-B are cross-sectional views of an imaging system and representatively illustrates the effect of heat on various components of the autofocus system in accordance with an exemplary embodiment of the present technology.
Figure 5A:
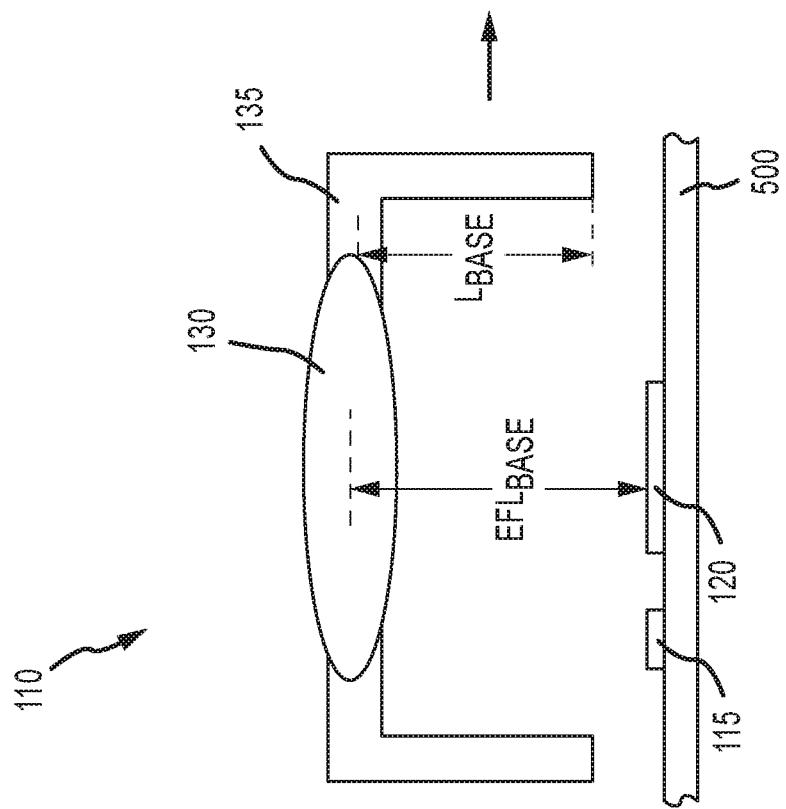

The image sensor 120 may be suitably configured to capture image data. For example, the image sensor 120 may comprise a pixel array (not shown) to detect light and convey information that constitutes an image by converting the variable attenuation of light waves (as they pass through or reflect off the object) into electrical signals. The pixel array may comprise a plurality of pixels arranged in rows and columns, and the pixel array may contain any number of rows and columns, for example, hundreds or thousands of rows and columns. Each pixel may comprise any suitable photosensor, such as a photogate, a photodiode, and the like, to detect light and convert the detected light into a charge. The image sensor 120 may be implemented in conjunction with any appropriate technology, such as active pixel sensors in complementary metal-oxide-semiconductors (CMOS) and charge-coupled devices. In various embodiments, the image sensor 120 may be mounted on a printed circuit board (PCB) 500 (FIG. 5).

The actuator 140 may be configured to move the lens assembly 110 along various axes (e.g., along an x-, y-, and/or z-axis) to improve image quality. The actuator 140 may comprise any suitable device or system capable of moving and/or repositioning the lens assembly 110 in response to a signal. The actuator 140 may be configured to move the lens assembly 110 for the purpose of performing autofocus functions, counteracting involuntary movements, such as hand jitter or shaking, and the like. For example, in one embodiment, the actuator 140 may comprise a voice coil motor, comprising a driving magnet (not shown) and a sensing magnet (not shown), that is responsive to a control signal from the control circuit 115. The actuator 140 may be limited in the amount of movement it can perform, whether self-limiting or due to the design of the system. For example, the camera module 105 may comprise a housing (not shown), with sidewalls, to house the lens assembly 110, the actuator 140, and the image sensor 120. As such, a maximum range of movement the actuator 140 may impart to the lens assembly 110 may be limited by the interior dimensions of the camera module housing.

According to various embodiments, portions of the actuator 140, such as the sensing magnet, may be physically coupled to the lens barrel 135. In other embodiments, however, the actuator 140 may be positioned within or adjacent to the lens assembly 110. The particular arrangement may be based on the type of actuator 140 used, the size and shape of the lens assembly 110, design choices, and the like.

The lens assembly 110 may be configured to focus light on a sensing surface of the image sensor 120. For example, according to various embodiments, the lens assembly 110 is positioned adjacent to the image sensor 120. The lens assembly 110 may comprise a lens to focus an image on the image sensor 120 and a lens barrel 135 to hold the lens. The lens assembly 110, the actuator 140, and the control circuit 115 may operate in conjunction with each other to provide an autofocus function. For example, the actuator 140 responds to the control circuit 115 to move the lens assembly 110 either closer to or away from the image sensor 120 to focus the image on the image sensor 120.

The lens 130 may comprise any lens or lens system suitable for focusing light on the image sensor 120 and may be positioned adjacent to a sensing surface of the image sensor 120. The lens 130 may be adjustable or fixed relative to the image sensor 120. For example, in an exemplary embodiment, the lens 130 may be coupled to the actuator 140 and configured to move along a plane that is perpendicular to the sensing surface of the image sensor 120 (i.e., movement closer to or away from the surface of the image sensor, in a z-direction). The lens 130 may further be configured to move along a plane that is parallel to the sensing surface of the image sensor 120 (i.e., in an x-direction and in a y-direction). In various embodiments, the lens 130 may comprise a plurality of lens elements arranged adjacent to each other. The lens 130 may be formed using any suitable material, such as glass, quartz glass, fluorite, germanium, meteoritic glass, polycarbonate, plastic, high-index plastic, and the like, or any combination thereof.

The lens barrel 135 comprises a structure configured to hold the lens 130. For example, various mounting techniques may be employed to mount the lens 130 to the lens barrel 135, such as hard mounting, drop-in mounting, elastomeric mounting, and the like. The lens barrel 135 may further comprise various elements to maintain proper air spacing and/or alignment of the lens 130 (or lens elements), such as retainer rings, snap rings, spun rims, and the like.

The lens barrel 135 may be formed using metals, such as aluminum, stainless steel, beryllium, titanium, and metal alloys, and/or nonmetals, such as glass, carbon fiber composites, or plastic, wherein each material may be described according to a coefficient of thermal expansion. As such, the lens barrel 135 may expand and contract based the type of material used to form the lens barrel 135. For example, a lens barrel 135 comprising metal may have a larger coefficient of thermal expansion than a lens barrel 135 comprising glass. In various embodiments, the material used to form the lens barrel 135 may differ from that used to form the lens 130.

In various embodiments, the camera module 105 may further configured to measure the position of the lens relative to the image sensor 120 and to measure a temperature of the camera module 105. For example, according to an exemplary embodiment, the camera module 105 comprises a position sensor 145 and a temperature sensor 150.

The position sensor 145 detects movement and a position of the lens 130. The position sensor 145 may comprise any suitable circuit for determining the position of the lens 130, such as a hall sensor. In such a case, the position sensor 145 may determine the position of the lens 130 by varying an output voltage in response to a magnetic field. The output voltage may correspond to a magnitude and direction the lens 130 relative to a reference point. According to various embodiments, the position sensor 145 may be formed on the same chip as the control circuit 115. In alternative embodiments, the position sensor 145 may be formed on a companion chip.

The temperature sensor 150 may be suitably configured to monitor and report the ambient temperature T inside and/or outside of the imaging system 100. The temperature sensor 150 may comprise any suitable device for monitoring and reporting temperature, such as a thermistor. The temperature sensor 150 may be configured to transmit a signal corresponding to the measured ambient temperature T of the imaging system 100 to the temperature register 225. According to various embodiments, the temperature sensor 150 may be formed on the same chip as the control circuit 115. In alternative embodiments, the temperature sensor 150 may be formed on a companion chip.

In various embodiments, the ISP 125 may perform various digital signal processing functions, such as color interpolation, color correction, facilitate autofocus, exposure adjustment, noise reduction, white balance adjustment, compression, and the like, to produce an output image. In an exemplary embodiment, the ISP 125 may be configured to receive and process image data to determine a degree of focus of an image (i.e., the amount that the image is in-focus/out-of-focus). The degree of focus may be represented by a numerical value. The ISP 125 may utilize the numerical value to further determine an initial target position $P_{TARGET\_0}$ for the lens 130 (and lens barrel 135), wherein the initial target position $P_{TARGET\_0}$ represents a required position of the lens 130 to focus the image. In general, the ISP 125 does not utilize information related to physical changes of the lens 130 and/or lens barrel 135 to determine the initial target position $P_{TARGET\_0}$.

The ISP 125 may comprise any number of devices and/or systems for performing calculations, transmitting and receiving image pixel data, measuring the degree of focus, and a storage unit for storing pixel data, such as random-access memory, non-volatile memory or any other memory device suitable for the particular application. Further, the ISP 125 may utilize any suitable techniques and/or methods for determining and/or calculating the degree of focus of the image. In various embodiments, the ISP 125 may be implemented with a programmable logic device, such as a field programmable gate array (FPGA) or any other device with reconfigurable digital circuits. In other embodiments, the ISP 125 may be implemented in hardware using non-programmable devices. The ISP 125 may be formed partially or entirely within an integrated circuit in silicon using any suitable CMOS techniques or fabrication processes, in an ASIC (application-specific integrated circuit), using a processor and memory system, or using another suitable implementation.

The ISP 125 may transmit the output image to an output device, such as a display screen or a memory component, for storing and/or viewing the image data. The output device may receive digital image data, such as video data, image data, frame data, and/or gain information from the ISP 125. In various embodiments, the output device may comprise an external device, such as a computer display, memory card, or some other external unit.

Figure 2:
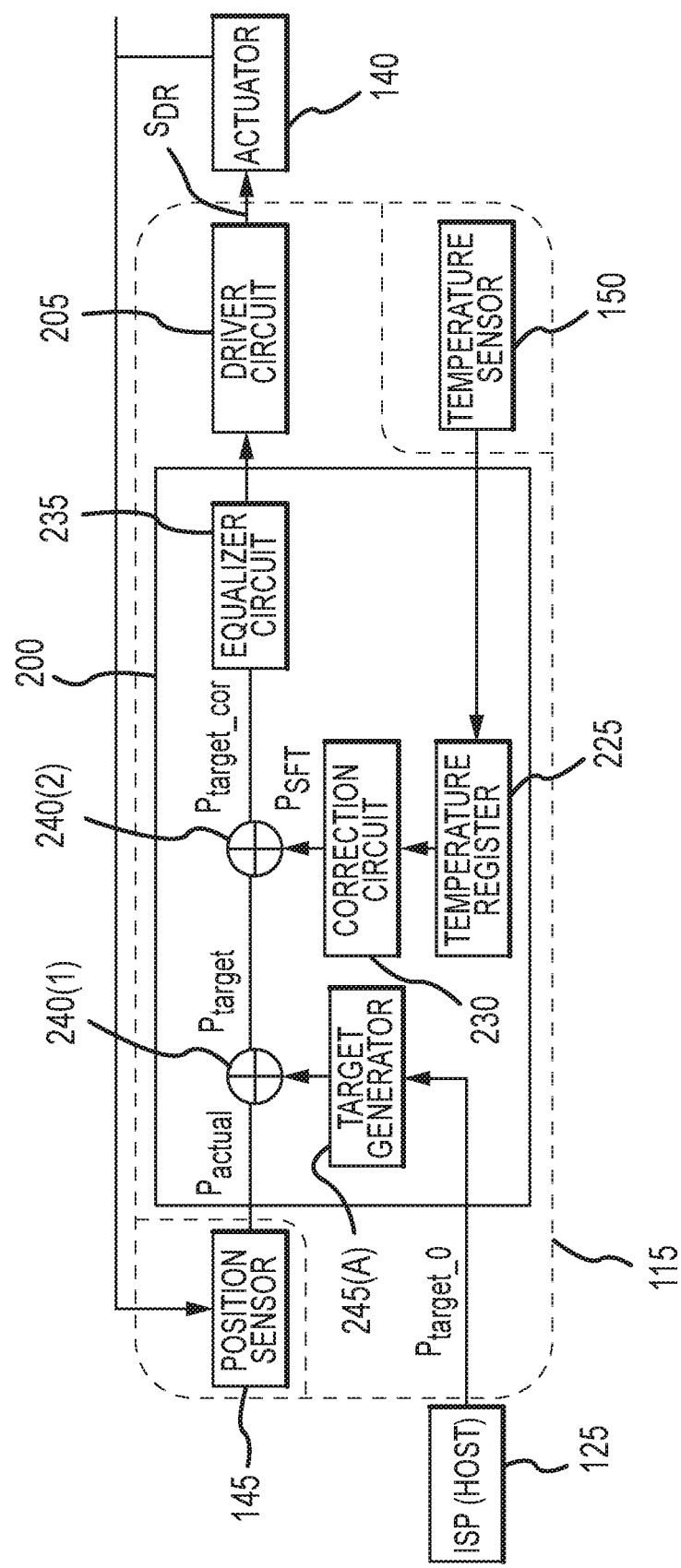
FIG. 2 is a block diagram of a portion of a closed-loop autofocus system in accordance with an exemplary embodiment of the present technology.
Figure 3:
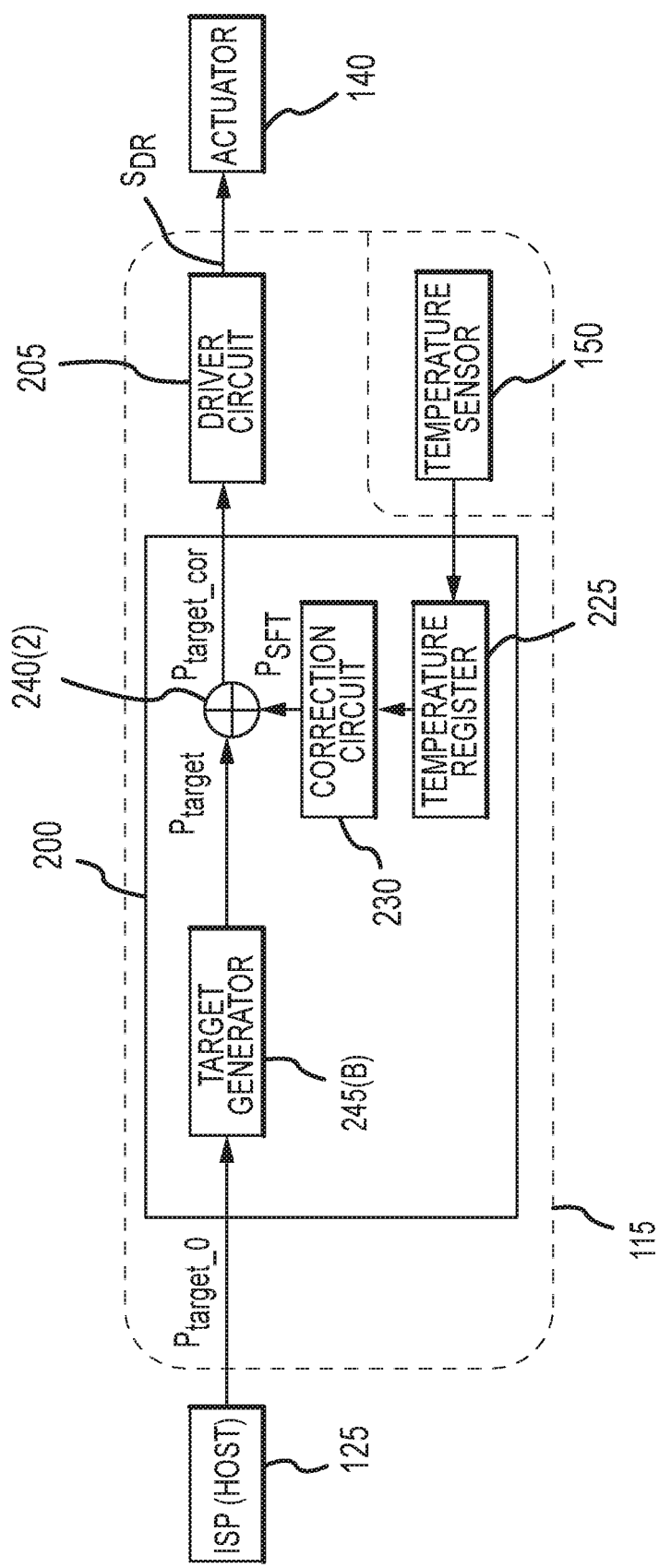
FIG. 3 is a block diagram of a portion of an open-loop autofocus system in accordance with an exemplary embodiment of the present technology.

Referring to FIGS. 1-3, the control circuit 115 controls and supplies power to various devices within the system. For example, the control circuit 115 may control and supply power to the actuator 140 to move the lens module 110 to a desired position. According to various embodiments, the control circuit 115 may supply a current, having a magnitude and direction, to the actuator 140. In general, the actuator 140 responds to the current by moving the lens module 110 an amount that is proportional to the amount of power supplied by the control circuit 115.

The control circuit 115 may comprise any suitable device and/or system capable of providing energy to the actuator 140. For example, the control circuit 115 may comprise a driver circuit 205 to provide a current to the actuator 140, wherein the actuator 140 responds to the magnitude and sign of the current by moving the lens module 110.

The driver circuit 205 facilitates movement of the lens module 110 to a desired position. The driver circuit 205 may comprise any suitable circuit for varying a voltage across the circuit in order to maintain a constant electrical current output in response to a control signal. For example, the driver circuit 205 may receive and respond to the corrected target position $P_{TARGET\_COR}$ from an operation unit 200 by generating a drive signal $S_{DR}$. The driver circuit 205 may apply the drive signal $S_{DR}$ to the actuator 140, wherein the drive signal $S_{DR}$ may correspond to the corrected target position $P_{TARGET\_COR}$. Alternatively or additionally, the driver circuit 205 may facilitate movement of the lens 130 and/or lens barrel 135 to achieve a desired position by controlling the current to the actuator 140, which in turn controls the magnitude and direction of movement of the lens module 110. For example, the driver circuit 205 may generate the current in either a first direction or an opposite second direction. The direction of the current may be computed according to the desired target position.

According to various embodiments, the control circuit 115 may operate in conjunction with and receive various signals from the ISP 125, the image sensor 120, and other sensor circuits, such as the position sensor 145 and the temperature sensor 150, to determine an appropriate amount of power to supply to the actuator 140 and/or an appropriate position for the lens module 110. For example, in an exemplary embodiment, the control circuit 115 may be coupled to and configured to receive the initial target position $P_{TARGET\_0}$ from the ISP 125. In various embodiments, the control circuit 115 may further receive a feedback signal from the actuator 140.

According to various embodiments, the control circuit 115 may further refine the initial target position $P_{TARGET\_0}$. For example, the control circuit 115 may be configured to compute the corrected target position $P_{TARGET\_COR}$. The corrected target position $P_{TARGET\_COR}$ may be the position of the lens 130 and/or lens barrel 135 that provides optimal image quality and/or a focused image. The control circuit 115 may comprise any device and/or system suitable for storing various data, performing logic functions, modulate a control signal, and/or performing various computations. For example, the control circuit 115 may comprise the operation unit 200 configured to store data and perform various computations. The operation unit 200 may be coupled to the driver circuit 205 and provide the driver circuit 205 with position information.

According to one embodiment, the position sensor 145 and the operation unit 200 may be formed on the same chip. In an alternative embodiment, the position sensor 145 may be formed on a companion chip. Similarly, the temperature sensor 150 may be formed on the same chip as the operation unit 200 or on a companion chip.

According to various embodiments, the operation unit 200 may comprise a target adjustment circuit 245. The target adjustment circuit 245(A/B) may be configured to further revise, refine, and/or adjust the initial target position $P_{target\_0}$. For example, the target adjustment circuit 245(A/B) may utilize the initial target position $P_{TARGET\_0}$ and adjust the initial target position $P_{TARGET\_0}$ according to various methods and techniques. In one embodiment, and referring to FIG. 2, the target adjustment circuit 245(A) may be configured to operate according to the methods and techniques disclosed in U.S. Pat. No. 9,520,823. In an alternative embodiment, and referring to FIG. 3, the target adjustment circuit 245(B) may be configured to operate according to the methods and techniques disclosed in U.S. patent application Ser. No. 15/450,640, filed Mar. 6, 2017. The target adjustment circuit 245 may be further configured to transmit the intermediate target position to an adder circuit 240. For example, an output terminal of the target adjustment circuit 245(A/B) may be coupled to an input terminal of the adder circuit 240.

According to various embodiments, the operation unit 200 may comprise one or more adder circuits 240, wherein each adder circuit 240 is configured to sum (i.e., add) one or more input values. The adder circuit 240 may comprise any device and/or system suitable for summing.

According to an exemplary embodiment, and referring to FIG. 2, the operation unit 200 may comprise a first adder circuit 240(1) configured to receive and sum data from the target adjustment circuit 245(A) with an actual position $P_{ACTUAL}$ of the lens module 110 to generate the target position $P_{TARGET}$. In the present case, the operation unit 200 further comprises a second adder circuit 240(2) configured to receive and sum the target position $P_{TARGET}$ and the position shift value $P_{SFT}$ to generate the corrected target position $P_{TARGET\_COR}$. In the present case, the second adder circuit 240(2) may be coupled to and configured to transmit the corrected target position $P_{TARGET\_COR}$ to an equalizer circuit 235 for further processing and/or modulation prior to being transmitted to the driver circuit 205.

In various embodiments, such as in a closed-loop system, the control circuit 115 and/or operation unit 200 may comprise the equalizer circuit 235. The equalizer circuit 235 may be configured to calculate an error value and apply a correction based on proportional, integral and derivative terms, and operate to minimize the error over time by adjusting a selected control variable. For example, the equalizer circuit 235 may comprise a conventional PID controller circuit (not shown) comprising a P controller to account for present values of the error, an I controller to account for past values of the error, and a D controller to account for possible future trends of the error, based on a current rate of change. In various embodiments, the equalizer circuit 235 may further comprise a filter (not shown) coupled to the PID controller to remove noise from various PID process signals.

According to an alternative embodiment, and referring to FIG. 3, the operation unit 200 comprises the second adder circuit 240(2) configured to receive and sum the target position $P_{TARGET}$ and the position shift value $P_{SFT}$, and generate the corrected target position $P_{TARGET\_COR}$. In the present case, however, the target adjustment circuit 245(B) generates the target position $P_{TARGET}$ and the second adder circuit 240(2) may be coupled to and configured to transmit the corrected target position $P_{TARGET\_COR}$ directly to the driver circuit 205.

According to various embodiments, the operation unit 200 may be configured to store temperature data and other relevant data. For example, the operation unit 200 may comprise a temperature register 225 to store temperature data from the temperature sensor 150. The operation unit 200 may further comprise other registers to store other data, such as the target position $P_{TARGET}$.

The temperature register 225 may be configured to store relevant data and communicate with the temperature sensor 150 and/or the correction circuit 230. For example, the register 235 may receive and store various temperature data (e.g., the ambient temperature T) from the temperature sensor 150, and transmit the temperature data to the correction circuit 230 or allow the correction circuit 230 to access the temperature data to perform various calculations. The register 235 may comprise any suitable memory or storage device capable of storing data.

Figure 4:
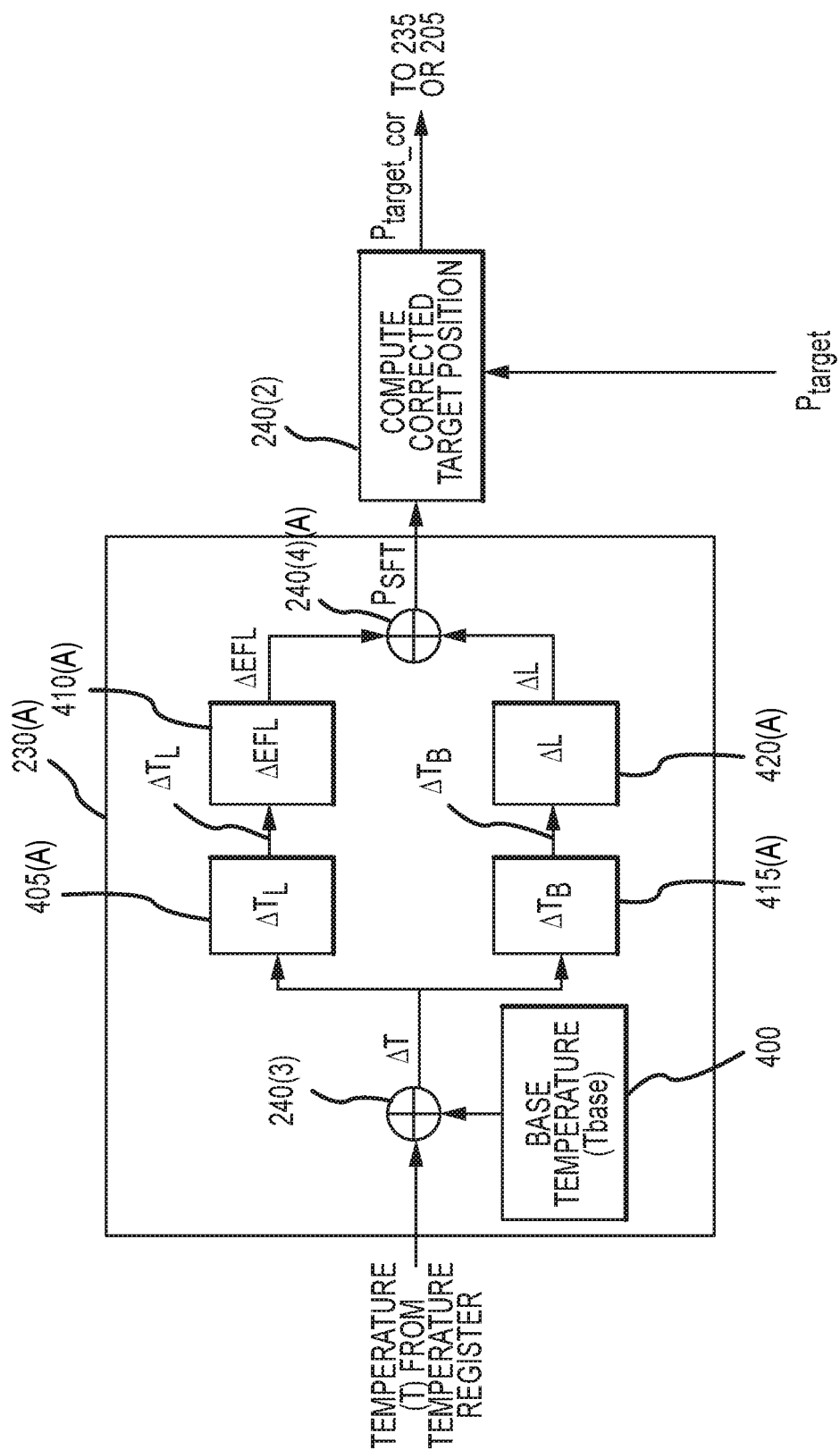
FIG. 4 is a block diagram of a correction circuit in accordance with an exemplary embodiment of the present technology.

Referring to FIGS. 1 and 4, according to various embodiments, the correction circuit 230 individually models the degree of focus shift due to ambient temperature changes of one or more temperature-sensitive components in the imaging system 100, such as: the lens 130, the lens barrel 135, the image sensor 120, the position sensor 145, the driving magnet (not shown), the sensing magnet (not shown), the spring (not shown), the PCB (not shown), and the like, and utilizes the model information to correct defocusing. In various embodiments, the correction circuit 230 may utilize known thermal characteristics (i.e., physical properties) of various temperature-sensitive components to determine the degree of focus shift and/or the corrected target position $P_{TARGET\_COR}$. In various embodiments, the correction circuit 230 may comprise any suitable number of computation circuits, storage devices, and the like. For example, the correction circuit 230 may comprise a plurality of computation circuits 405, 410, 415, 420, a first, second, third, and fourth, respectively, wherein each computation circuit 405, 410, 415, 420 is configured to employ a predetermined formula to compute a desired variable.

For example, in an a first embodiment and referring to FIG. 4, the correction circuit 230(A) is configured to compute a thermal response $\Delta T_L$ and a change in an effective focal length (EFL) $\Delta EFL$ of the lens 130, and a thermal response $\Delta T_B$ and a change in length $\Delta L$ (i.e., thermal expansion) of the lens barrel 135.

According to the present embodiment, the correction circuit 230(A) may comprise a base temperature register 400 to store a predetermined base temperature $T_{BASE}$, for example 25 degrees Celsius. The correction circuit 230(A) may further comprise other circuitry suitable for performing computations, such as addition, subtraction, and the like, to compute the position shift value $P_{SFT}$. For example, according to an exemplary embodiment, the correction circuit 230 may comprise a third adder circuit 240(3) configured to compute the relative temperature $\Delta T$, given by:

$$\Delta T = T - T_{BASE} \qquad \text{(Formula 1)}$$

where T is the ambient temperature and $T_{BASE}$ is the base temperature.

The first computation circuit 405(A) may be configured to compute a change in the temperature $\Delta T_L$ (i.e., thermal response) of the lens 130, given by the transfer function:

$$\Delta T_L(s) = \frac{1}{1 + R_{LT}C_{LT} \times s} \times \Delta T(s), \qquad \text{(Formula 2)}$$

where $R_{LT}C_{LT}$ is the thermal time constant of the lens, $\Delta T$ is the change in ambient temperature, and s is a complex variable, where $s = j \cdot \omega$. The change in the temperature $\Delta T_L$ (i.e., thermal response) of the lens 130 may be represented in the time domain according to the following transfer function:

$$\Delta T_L(t) = e^{-\frac{t}{R_{LT}C_{LT}}} \times \Delta T(t), \qquad \text{(Formula 2')}$$

where t is time measured in seconds.

The second computation circuit 410(A) may be configured to compute a change in the effective focal length $\Delta EFL$ of the lens 130, given by:

$$\Delta EFL = \Delta T_L \times C_{EFL} \qquad \text{(Formula 3),}$$

where $\Delta T_L$ is the thermal response of the lens as computed in Formula 1 and $C_{EFL}$ is the temperature characteristic coefficient of the lens.

The third computation circuit 415(A) may be configured to compute a change in the temperature $\Delta T_B$ (i.e., thermal response) of the lens barrel 135, given by the transfer function:

$$\Delta T_B(s) = \frac{1}{1 + R_{BT}C_{BT} \times s} \times \Delta T(s), \quad \text{(Formula 4)}$$

where $R_{BT}C_{BT}$ is the thermal time constant of the lens barrel 135 and $\Delta T$ is the change in ambient temperature. The change in the temperature $\Delta T_B$ (i.e., thermal response) of the lens barrel 135 may be represented in the time domain according to the following transfer function:

$$\Delta T_B(t) = e^{-\frac{t}{R_{BT}C_{BT}}} \times \Delta T(t), \quad \text{(Formula 4')}$$

where t is time measured in seconds.

The fourth computation circuit 420(A) may be configured to compute a change in the length $\Delta L$ of the lens barrel 135, given by:

$$\Delta L = L_{BASE} \times \alpha \times \Delta T_B \quad \text{(Formula 5)},$$

where $L_{BASE}$ is the base length of the lens barrel 135, $\alpha$ is the linear expansion coefficient of the lens barrel 135, and $\Delta T_B$ is the change in temperature of the lens barrel 135 as computed in Formula 4.

The correction circuit 230(A) may further comprise a fourth adder circuit 240(4)(A) to compute the position shift value $P_{SFT}$, given by:

$$P_{SFT} = \Delta EFL + \Delta L \quad \text{(Formula 6)},$$

where $\Delta EFL$ is the change in effective focal length of the lens as calculated in Formula 3 and $\Delta L$ is the change in the length of the lens barrel 135 as calculated in Formula 5. The fourth adder circuit 240(4)(A) may be coupled to the second adder circuit 240(2), wherein the second adder circuit 240(2) may be configured to compute the corrected target position $P_{TARGET\_COR}$, given by:

$$P_{TARGET\_COR} = P_{TARGET} - P_{SFT} \quad \text{(Formula 7)}$$

where $P_{TARGET}$ is the target position provided by the ISP 125 and $P_{SFT}$ is the position shift value according to Formula 6.

Figure 11:
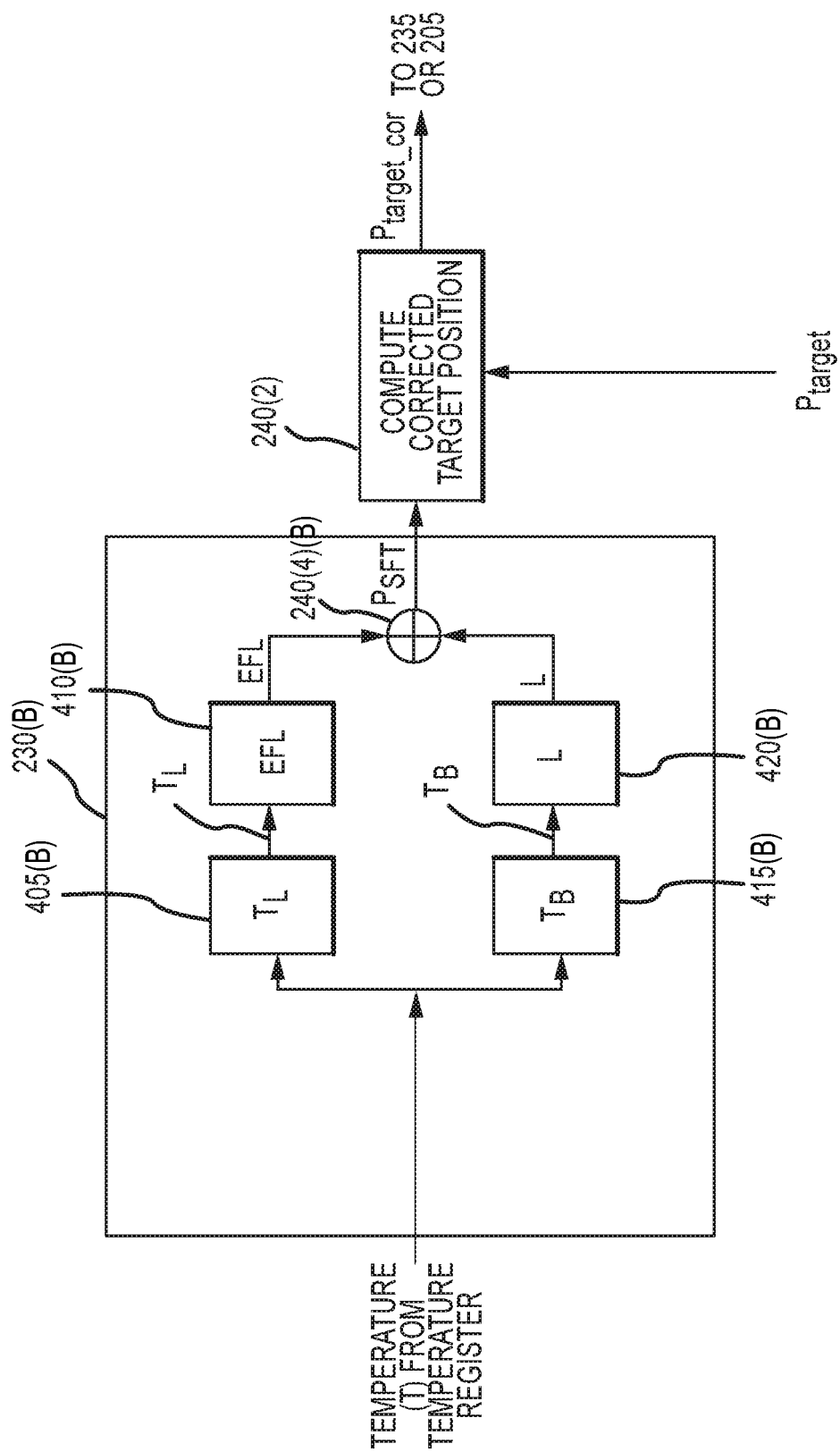
FIG. 11 is a block diagram of a correction circuit in accordance with a second embodiment of the present technology.
Figure 12:
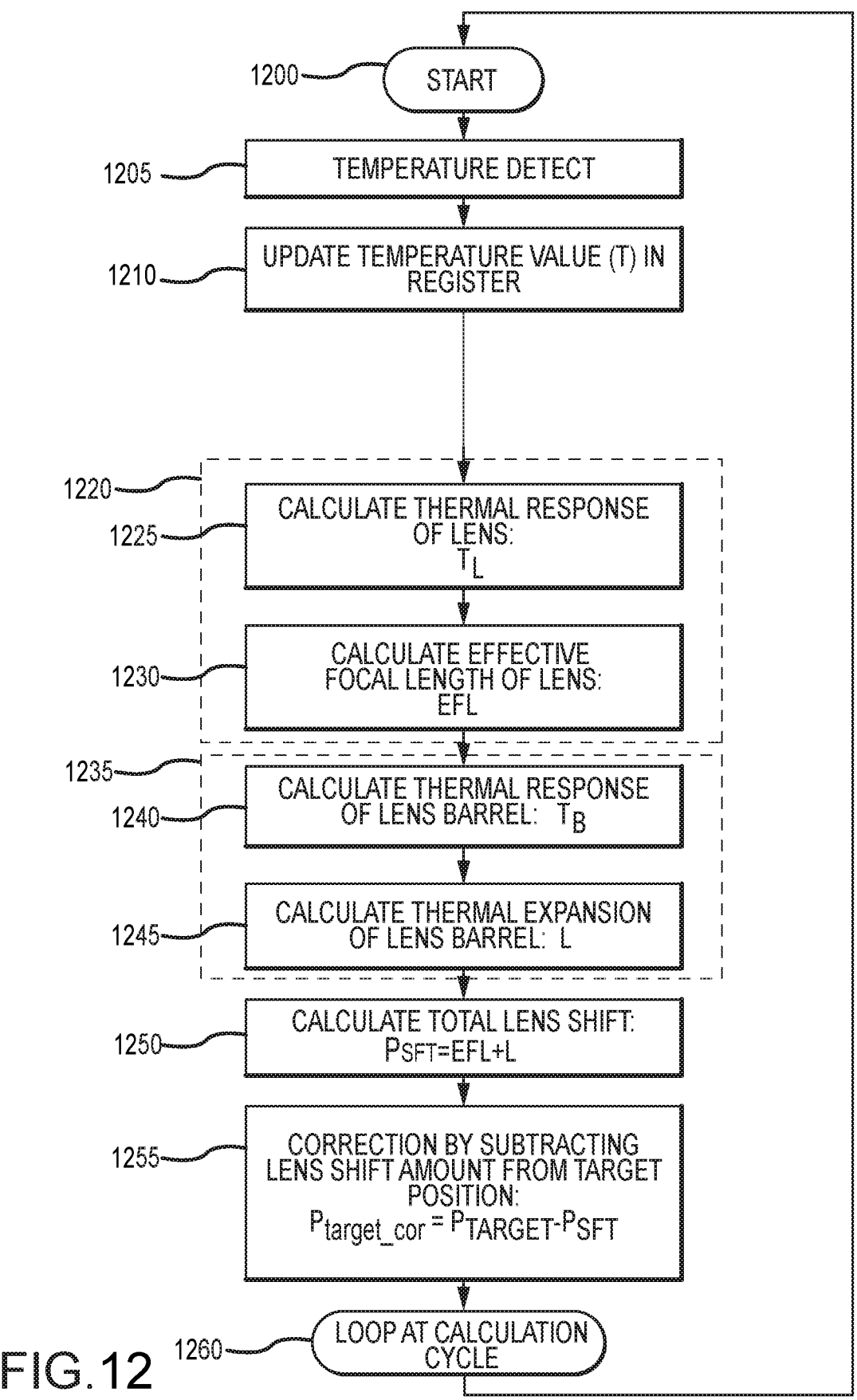
FIG. 12 is a flowchart for adjusting the actuator according to individual component calculations in accordance with the embodiment of FIG. 11.

According to a second embodiment and referring to FIG. 11, the correction circuit 230(B) is configured to compute a thermal response $T_L$ and an effective focal length EFL of the lens 130, and a thermal response $T_B$ and a length L (i.e., thermal expansion) of the lens barrel 135. According to the present embodiment, the first computation circuit may be configured to compute a temperature $T_L$ (i.e., thermal response) of the lens 130, given by the transfer function:

$$T_L(s) = \frac{1}{1 + R_{LT}C_{LT} \times s} \times T(s), \quad \text{(Formula 8)}$$

where $R_{LT}C_{LT}$ is the thermal time constant of the lens, T is the ambient temperature, and s is a complex variable, where $s=j\cdot\omega$. The thermal response of the lens $T_L$ may be represented in the time domain according to the following transfer function:

$$T_L(t) = e^{-\frac{t}{R_{LT}C_{LT}}} \times T(t), \quad \text{(Formula 8')}$$

where t is time measured in seconds.

The second computation circuit 410(B) may be configured to compute an effective focal length EFL of the lens 130, given by:

$$EFL = T_L \times C_{EFL} \quad \text{(Formula 9)}$$

where $T_L$ is the thermal response of the lens as computed in Formula 8 and $C_{EFL}$ is the temperature characteristic coefficient of the lens.

The third computation circuit 415(B) may be configured to compute a temperature $T_B$ (i.e., thermal response) of the lens barrel 135, given by the transfer function:

$$T_B(s) = \frac{1}{1 + R_{BT}C_{BT} \times s} \times T(s), \quad \text{(Formula 10)}$$

where $R_{BT}C_{BT}$ is the thermal time constant of the lens barrel 135 and T is the ambient temperature. The lens barrel temperature $T_B$ may be represented in the time domain according to the following transfer function:

$$T_B(t) = e^{-\frac{t}{R_{BT}C_{BT}}} \times T(t), \quad \text{(Formula 10')}$$

where t is time measured in seconds.

The fourth computation circuit 420(A) may be configured to compute a the length L of the lens barrel 135, given by:

$$L = L_{BASE} \times \alpha \times T_B \quad \text{(Formula 11)},$$

where $L_{BASE}$ is the base length of the lens barrel 135, $\alpha$ is the linear expansion coefficient of the lens barrel 135, and $T_B$ is the temperature of the lens barrel 135 as computed in Formula 10.

The correction circuit 230(B) may further comprise a fourth adder circuit 240(4)(B) to compute the position shift value $P_{SFT}$, given by:

$$P_{SFT} = EFL + L \quad \text{(Formula 12)},$$

where EFL is the effective focal length of the lens as calculated in Formula 9 and L is the length of the lens barrel 135 as calculated in Formula 11. The fourth adder circuit 240(4)(B) may be coupled to the second adder circuit 240(2), wherein the second adder circuit 240(2) may be configured to compute the corrected target position $P_{TARGET\_COR}$, given by:

$$P_{TARGET\_COR} = P_{TARGET} - P_{SFT} \quad \text{(Formula 13)},$$

where $P_{TARGET}$ is the target position provided by the ISP 125 and $P_{SFT}$ is the position shift value according to Formula 6.

According to various embodiments, the correction circuit 230 may be further configured to compute the position shift value $P_{SFT}$ according to the thermal response and the effective focal length. The correction circuit 230 may be coupled to and configured to transmit the position shift value $P_{SFT}$ to the second adder circuit 240(2).

According to alternative embodiments where the correction circuit 230 models the degree of focus according to different temperature-sensitive components, such as the springs, the driving magnet, and/or the sensing magnet, the thermal response and effects of the thermal response may be determined for each component in the same or similar manner as above.

In operation, the imaging system 100 utilizes various equations to individually model the thermal response of multiple components of the imaging system 100 to adjust the target position of the lens module 110. According to various embodiments, the imaging system 100 may adjust the target position according to an ambient temperature of the imaging system 100 and utilize the ambient temperature to compute a thermal response and a change in the thermal expansion of the lens barrel 135, and a thermal response and a change in the effective focal length of the lens 130. According to various embodiments, the imaging system 100 utilizes these variables to further compute the position shift value, which is used to adjust the target position of the lens module 110 to determine the corrected target position.

In an exemplary operation, and referring to FIGS. 1, 3, 4, 5A-B, and 8, the imaging system 100 may be configured to detect the ambient temperature T (805). For example, the imaging system 100 may utilize the temperature sensor 150 to measure and/or detect the ambient temperature T of the camera module 105. The imaging system 100 may further store and/or update the ambient temperature T (810). For example, the temperature register 225 may store a current ambient temperature T. The temperature sensor 150 and the temperature register 225 may operate in conjunction to detect and store a measured ambient temperature T at predetermined time intervals.

The imaging system 100 may further calculate the relative temperature $\Delta T$ (815). For example, the correction circuit 230(A) may utilize the base temperature $T_{BASE}$ stored in the base temperature register 400 and the ambient temperature T stored in the temperature register 225 to compute the relative temperature $\Delta T$ according to Formula 1. According to an exemplary embodiment, the adder circuit 240(4)(A) may be utilized to compute Formula 1.

The imaging system 100 may then utilize the relative temperature $\Delta T$ to model the position shift of the lens 130 (820). For example, the correction circuit 230(A) may employ the first computation circuit 405(A) to compute the thermal response of the lens according to Formula 2 (825). The correction circuit 230(A) may then employ the second computation circuit 410 to compute the change in effective focal length of the lens 130 according to Formula 3 (830).

The imaging system 100 may further utilize the relative temperature $\Delta T$ to model the thermal expansion of the lens barrel 135 (835). For example, the correction circuit 230(A) may employ the third computation circuit 415(A) to compute the thermal response $\Delta T_B$ of the lens barrel 135 according to Formula 4 (840). The correction circuit 230(A) may then employ the fourth computation circuit 420(A) to compute the change in length $\Delta L$ of the lens barrel 135 according to Formula 5 (845).

The imaging system 100 may then utilize the change in length $\Delta L$ of the lens barrel 135 and the change in effective focal length $\Delta EFL$ of the lens 130 to calculate the position shift value $P_{SFT}$ (850). For example, the correction circuit 230(A) may employ the adder circuit 240(4)(A) to compute the position shift value $P_{SFT}$ according to Formula 6.

The imaging system 100 may then utilize the position shift value $P_{SFT}$ and the target position $P_{TARGET}$ to compute the corrected target position $P_{TARGET\_COR}$. For example, the operation unit 200 may employ the second adder circuit 240(2) to compute the corrected target position $P_{TARGET\_COR}$ according to Formula 7. The imaging system 100 may continue to adjust the target position by continuously measuring the ambient temperature T, updating the temperature data in the temperature register 225, re-computing the thermal response (e.g., $\Delta T_L$, $\Delta T_B$) and other relevant variables (e.g., $\Delta L$, $\Delta EFL$) relating to the lens 130 and lens barrel 135, and recalculating the position shift value $P_{SFT}$ and corrected target position $P_{TARGET\_COR}$ (860). For example, the imaging system 100 may perform the operation according to a predetermined time interval, such as every 5 seconds after an initial start-up (800).

Figure 6:
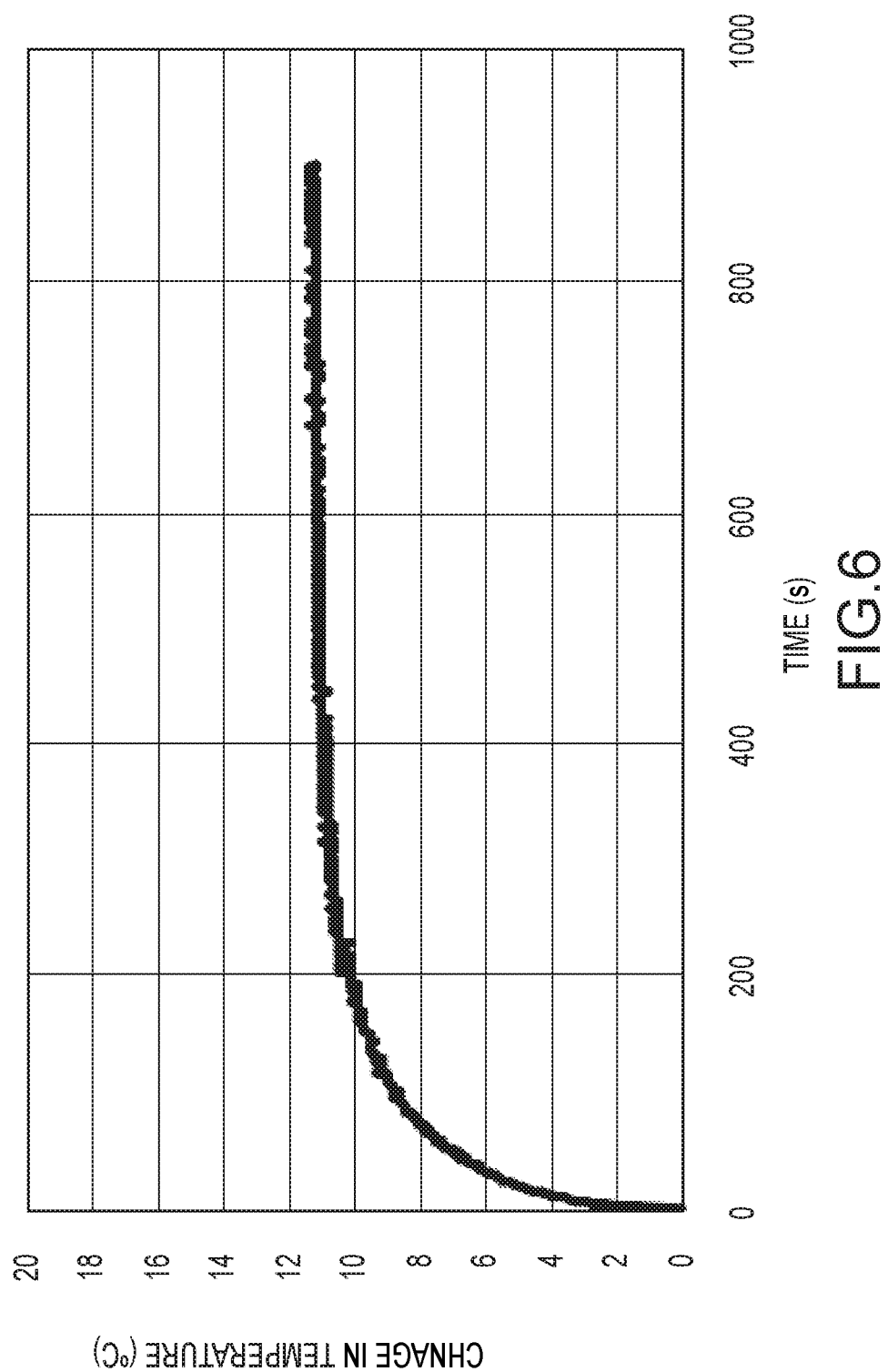
FIG. 6 is a graph of a change in the ambient temperature versus time in accordance with an exemplary embodiment the present technology.
Figure 7:
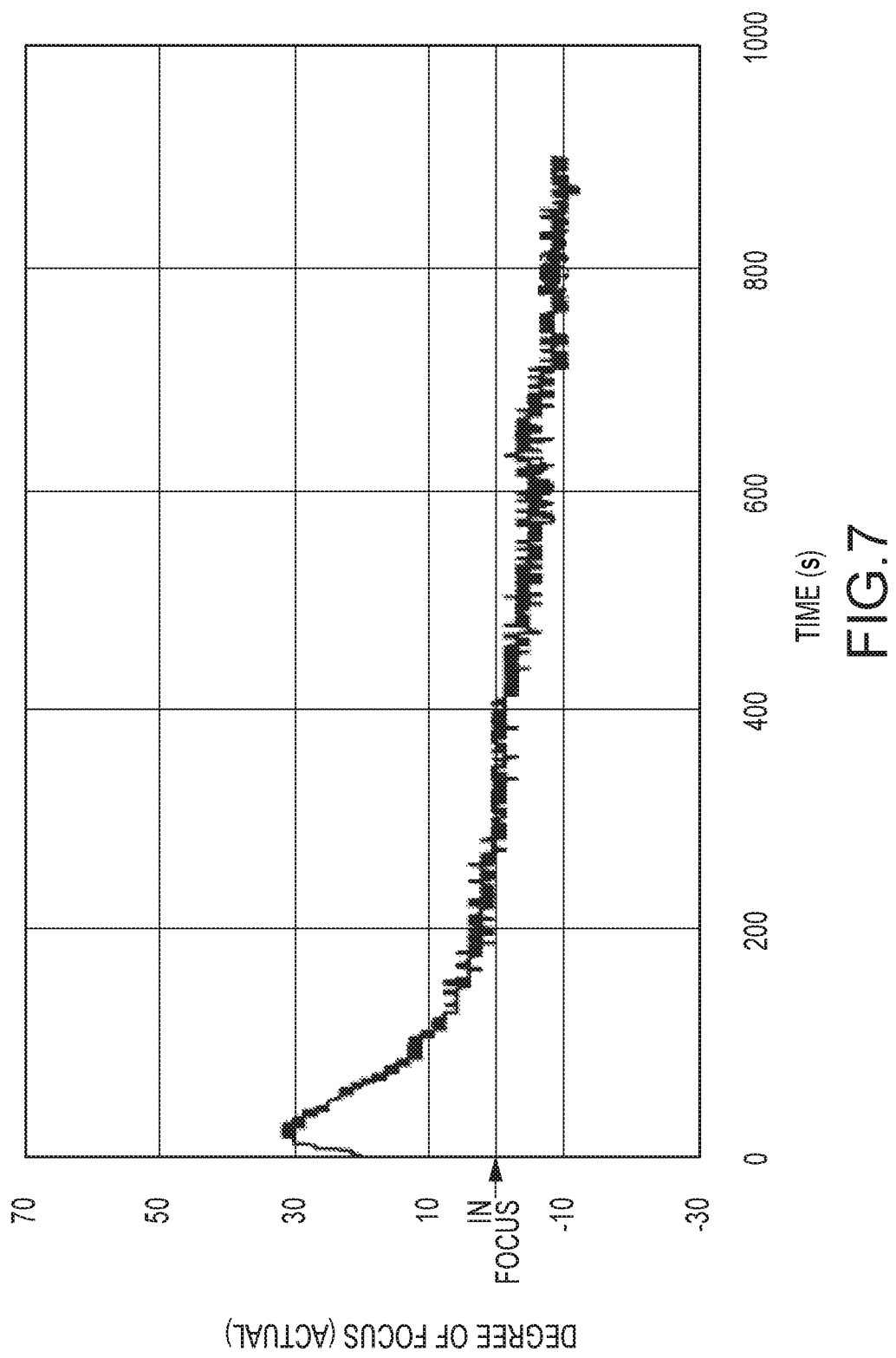
FIG. 7 is a graph of an actual degree of focus of an autofocus system versus time in accordance with an exemplary embodiment of the present technology.
Figure 8:
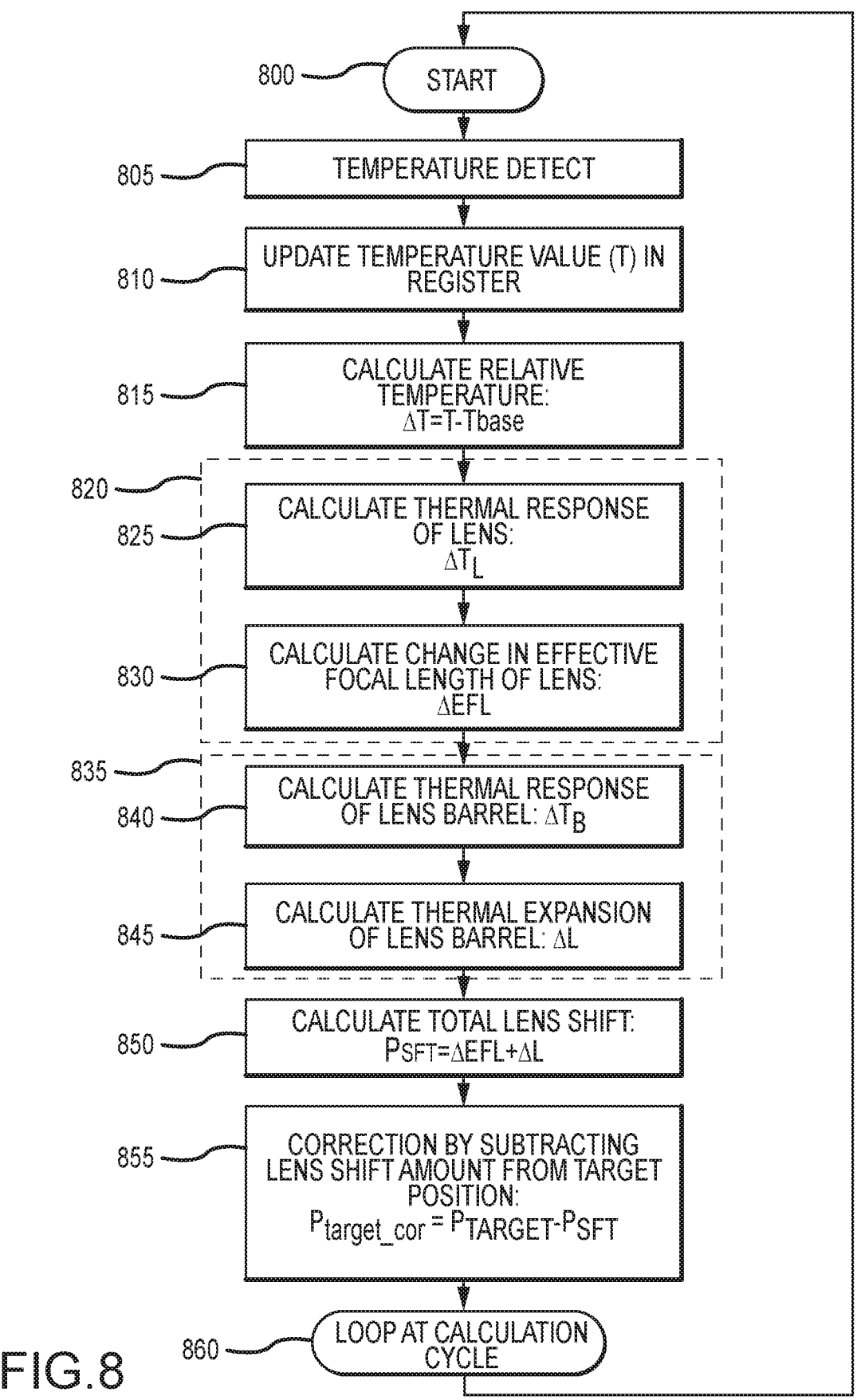
FIG. 8 is a flowchart for adjusting the actuator according to individual component calculations in accordance with an exemplary embodiment of the present technology.
Figure 9:
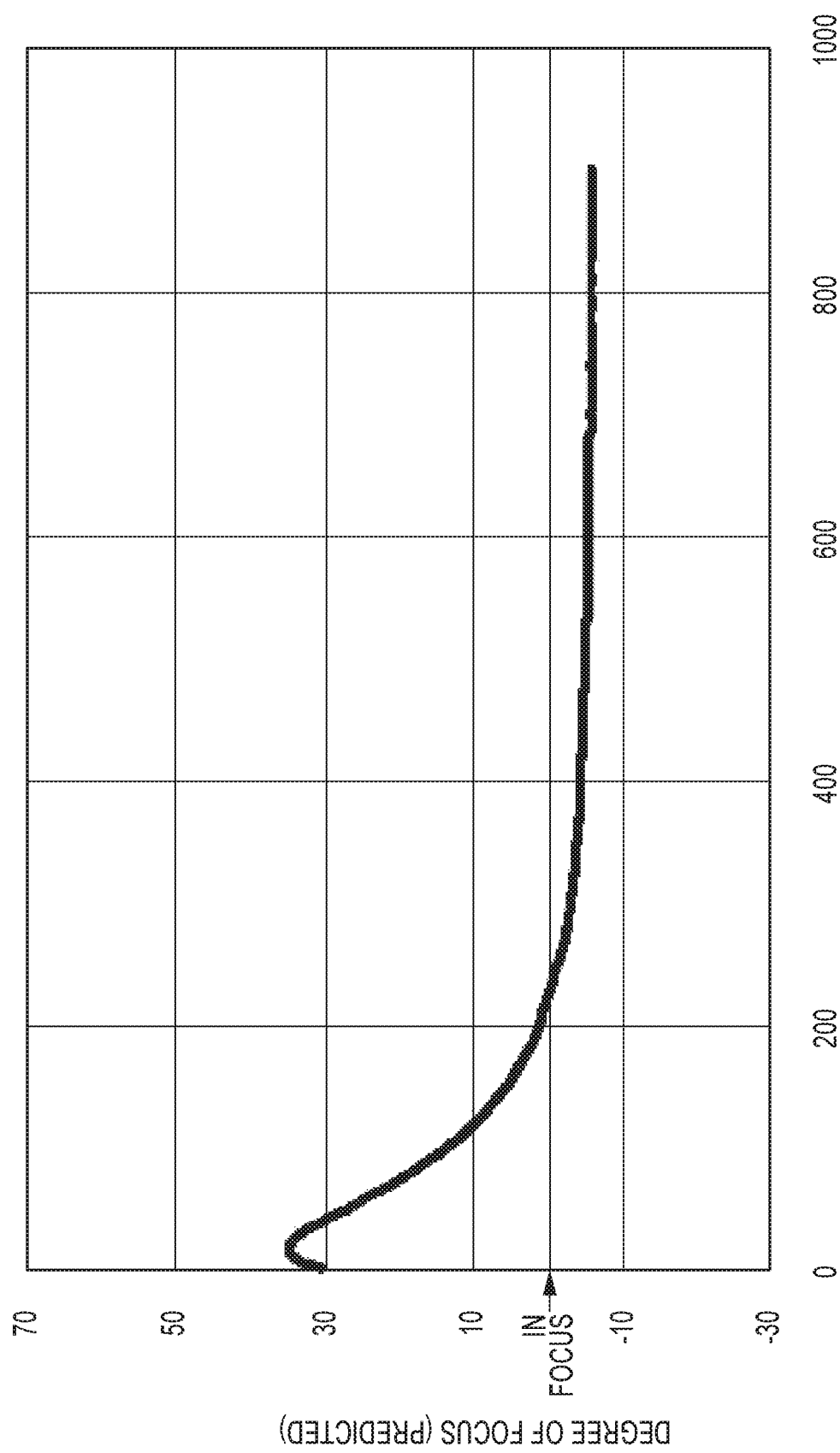
FIG. 9 is a graph of a predicted degree of focus of an autofocus system versus time in accordance with an exemplary embodiment of the present technology.
Figure 10:
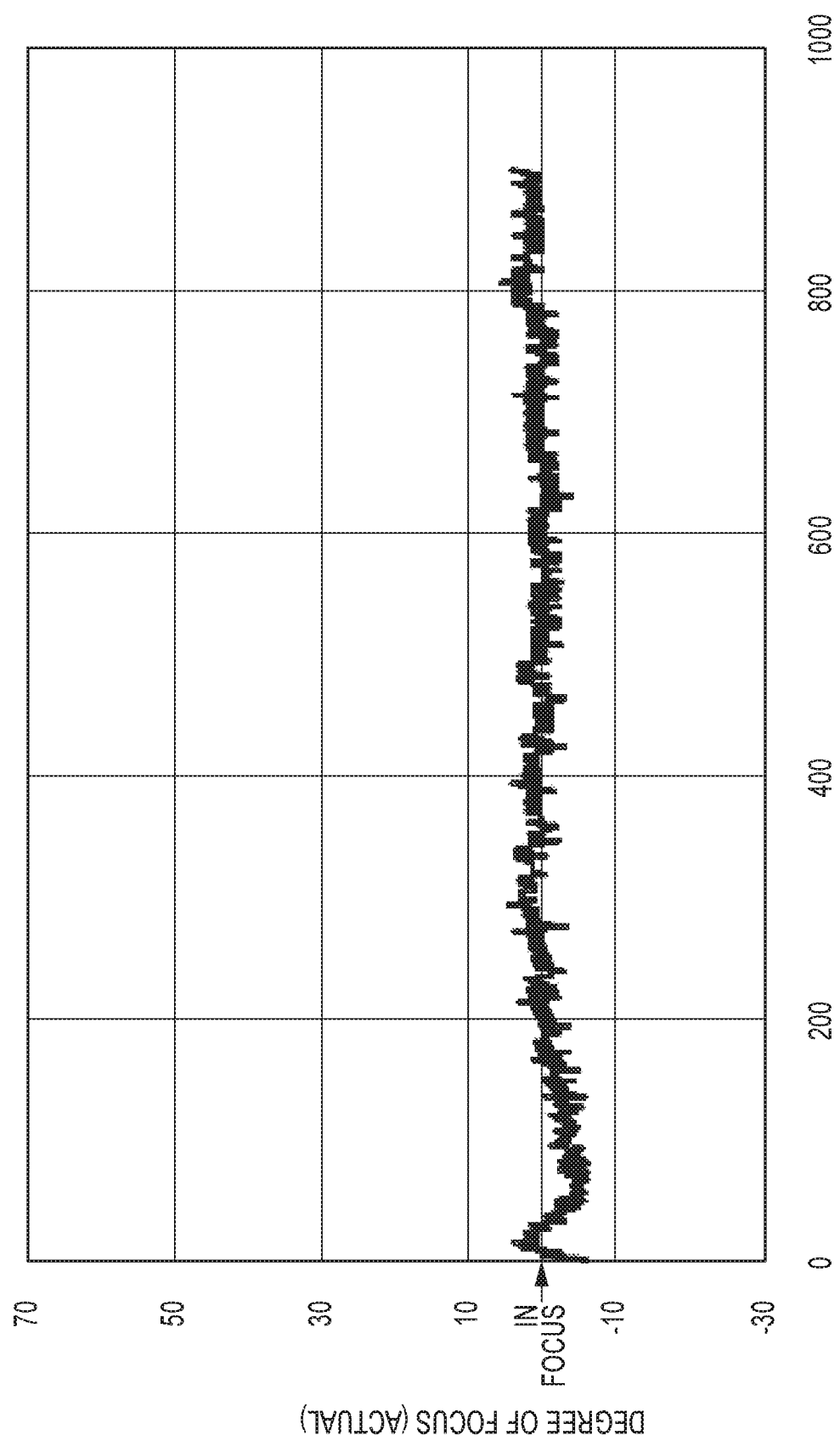
FIG. 10 is a graph of an actual degree of focus versus time after a position shift value has been applied in accordance with an exemplary embodiment of the present technology.

In the present operation and over some period of time, it is observed that the imaging system 100 is able to substantially predict (i.e., model) the thermal response of the lens 130 and lens barrel 135 and resulting deviation of the lens 130 from the target position as a result of changes in the ambient temperature, for example as illustrated in FIG. 9 and FIG. 6, respectively, and described according to the degree of focus. FIG. 7 illustrates the degree of focus that would normally occur as a result of temperature changes and the effect on the lens 130 and the lens barrel 135. When the correction circuit 230 subtracts the position shift value $P_{SFT}$ from the target position $P_{TARGET}$, the degree of focus that would normally occur as a result of temperature changes is effectively cancelled out, for example as illustrated in FIG. 10. Accordingly, the degree of focus is improved (e.g., deviation of the lens 130 from the target position is decreased, resulting in an improved (i.e., focused) image.

In an alternative operation, and referring to FIGS. 1, 3, 5A-B, 11 and 12, the imaging system 100 may be configured to detect the ambient temperature T (1205). For example, the imaging system 100 may utilize the temperature sensor 150 to measure and/or detect the ambient temperature T of the camera module 105. The imaging system 100 may further store and/or update the ambient temperature T (1210). For example, the temperature register 225 may store a current ambient temperature T. The temperature sensor 150 and the temperature register 225 may operate in conjunction to detect and store a measured ambient temperature T at predetermined time intervals.

The imaging system 100 may then utilize the ambient temperature T to model the position shift of the lens 130 (1220). For example, the correction circuit 230(B) may employ the first computation circuit 405(B) to compute the thermal response $T_L$ of the lens according to Formula 8 (1225). The correction circuit 230(B) may then employ the second computation circuit 410(B) to compute the effective focal length of the lens 130 according to Formula 9 (1230).

The imaging system 100 may further utilize the ambient temperature T to model the thermal expansion of the lens barrel 135 (1235). For example, the correction circuit 230 (B) may employ the third computation circuit 415(B) to compute the thermal response $T_B$ of the lens barrel 135 according to Formula 10 (1240). The correction circuit 230(B) may then employ the fourth computation circuit 420(B) to compute the length L of the lens barrel 135 according to Formula 11 (1245).

The imaging system 100 may then utilize the length L of the lens barrel 135 and the effective focal length EFL of the lens 130 to calculate the position shift value $P_{SFT}$ (1250). For example, the correction circuit 230(B) may employ the adder circuit 240(4) to compute the position shift value $P_{SFT}$ according to Formula 12.

The imaging system 100 may then utilize the position shift value $P_{SFT}$ and the target position $P_{TARGET}$ to compute the corrected target position $P_{TARGET\_COR}$. For example, the operation unit 200 may employ the second adder circuit 240(2) to compute the corrected target position $P_{TARGET\_COR}$ according to Formula 13. The imaging system 100 may continue to adjust the target position by continuously measuring the ambient temperature T, updating the temperature data in the temperature register 225, re-computing the thermal response (e.g., $T_L$, $T_B$) and other relevant variables (e.g., L, EFL) relating to the lens 130 and lens barrel 135, and recalculating the position shift value $P_{SFT}$ and corrected target position $P_{TARGET\_COR}$ (1260). For example, the imaging system 100 may perform the operation according to a predetermined time interval, such as every 5 seconds after an initial start-up (800).

Figure 13:
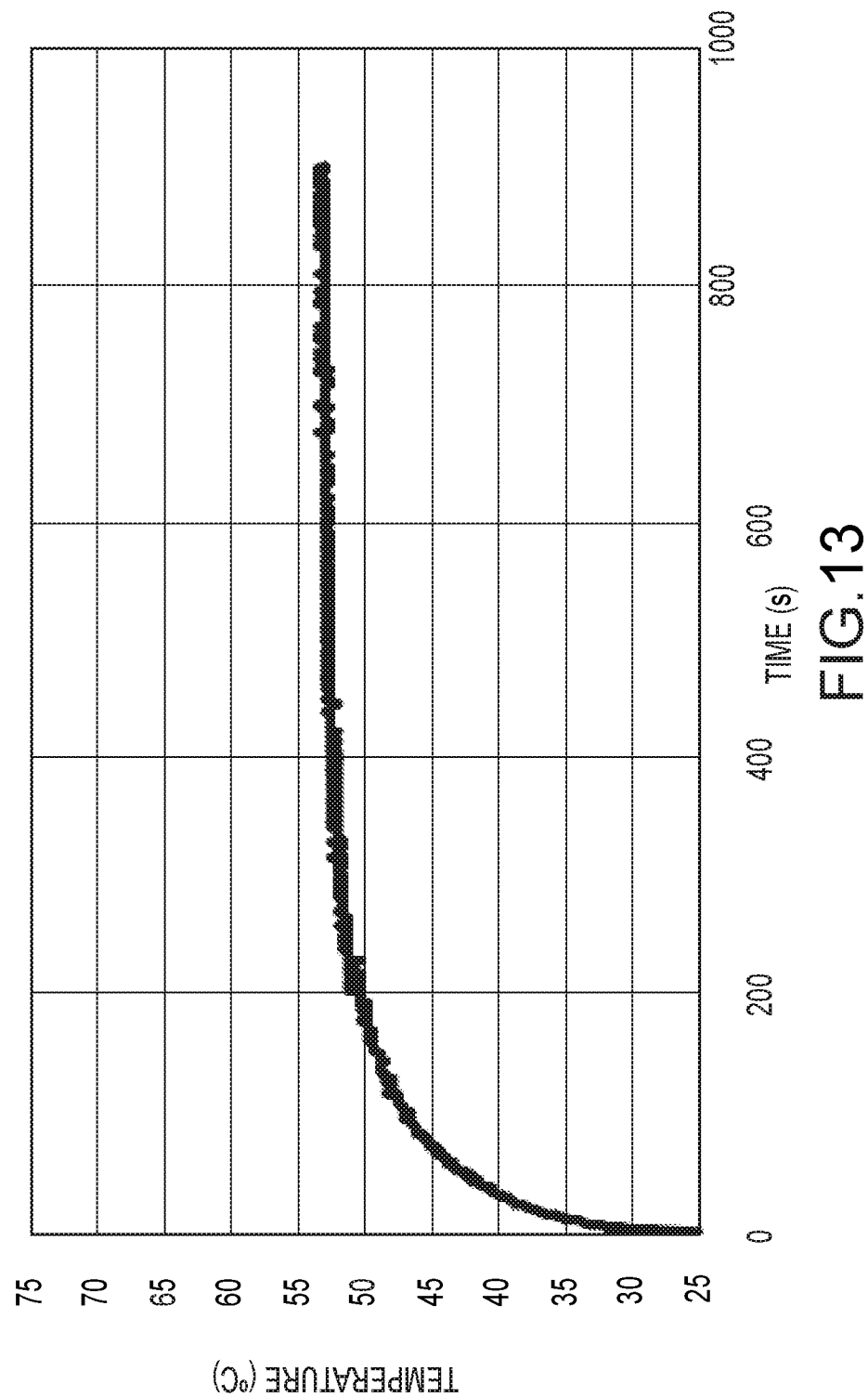
FIG. 13 is a graph of the ambient temperature versus time in accordance with an exemplary embodiment the present technology.

In the present operation and over some period of time, it is observed that the imaging system 100 is able to substantially predict (i.e., model) the thermal response of the lens 130 and lens barrel 135 and resulting deviation of the lens 130 from the target position as a result of changes in the ambient temperature, for example as illustrated in FIG. 13. FIG. 7 illustrates the degree of focus that would normally occur as a result of temperature changes and the effect on the lens 130 and the lens barrel 135. When the correction circuit 230(B) subtracts the position shift value $P_{SFT}$ from the target position $P_{TARGET}$, the degree of focus that would normally occur as a result of temperature changes is effectively cancelled out, for example as illustrated in FIG. 10. Accordingly, the degree of focus is improved (e.g., deviation of the lens 130 from the target position is decreased, resulting in an improved (i.e., focused) image.

In the foregoing description, the technology has been described with reference to specific exemplary embodiments. The particular implementations shown and described are illustrative of the technology and its best mode and are not intended to otherwise limit the scope of the present technology in any way. Indeed, for the sake of brevity, conventional manufacturing, connection, preparation, and other functional aspects of the method and system may not be described in detail. Furthermore, the connecting lines shown in the various figures are intended to represent exemplary functional relationships and/or steps between the various elements. Many alternative or additional functional relationships or physical connections may be present in a practical system.

The technology has been described with reference to specific exemplary embodiments. Various modifications and changes, however, may be made without departing from the scope of the present technology. The description and figures are to be regarded in an illustrative manner, rather than a restrictive one and all such modifications are intended to be included within the scope of the present technology. Accordingly, the scope of the technology should be determined by the generic embodiments described and their legal equivalents rather than by merely the specific examples described above. For example, the steps recited in any method or process embodiment may be executed in any order, unless otherwise expressly specified, and are not limited to the explicit order presented in the specific examples. Additionally, the components and/or elements recited in any apparatus embodiment may be assembled or otherwise operationally configured in a variety of permutations to produce substantially the same result as the present technology and are accordingly not limited to the specific configuration recited in the specific examples.

Benefits, other advantages and solutions to problems have been described above with regard to particular embodiments. Any benefit, advantage, solution to problems or any element that may cause any particular benefit, advantage or solution to occur or to become more pronounced, however, is not to be construed as a critical, required or essential feature or component.

The terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same.

The present technology has been described above with reference to an exemplary embodiment. However, changes and modifications may be made to the exemplary embodiment without departing from the scope of the present technology. These and other changes or modifications are intended to be included within the scope of the present technology, as expressed in the following claims.

The invention claimed is:

1. An autofocus apparatus, comprising:
   a first temperature-sensitive component having a first physical property;
   a second temperature-sensitive component positioned adjacent to the first temperature-sensitive component and having a second physical property;
   a temperature sensor adjacent to the first and second temperature-sensitive components and configured to:
   measure an ambient temperature around the first and second temperature-sensitive components; and
   generate temperature data; and
   a computation circuit coupled to the temperature sensor and configured to:
   receive the temperature data; and
   compute a value of the first physical property based on the measured ambient temperature and a first thermal response;
   compute a value of the second physical property based on the measured ambient temperature and a second thermal response; and
   compute a shift value using the value of the first physical property and the value of the second physical property.

2. The autofocus apparatus according to claim 1, wherein the first and second temperature-sensitive components each comprise one of:
   a lens, a lens barrel, a driving magnet, a spring, a substrate, a sensing magnet, a position sensor, or an image sensor.

3. The autofocus apparatus according to claim 1, wherein the first temperature-sensitive component comprises a lens and the second temperature-sensitive component comprises a lens barrel.

4. The autofocus apparatus according to claim 3, wherein the computation circuit is further configured to compute:
   the first thermal response of the lens based on the measured ambient temperature; and
   the second thermal response of the lens barrel based on the measured ambient temperature.

5. The autofocus apparatus according to claim 4, wherein the computation circuit computes:
   the first thermal response also based on a first thermal time constant of the lens; and the second thermal response also based on a second thermal time constant of the lens barrel.

6. The autofocus apparatus according to claim 4, wherein:
the first physical property comprises an effective focal length of the lens and the second physical property comprises a length of the lens barrel; and
the computation circuit is further configured to compute:
the effective focal length of the lens based on the first thermal response; and
the length of the lens barrel based on the second thermal response.

7. The autofocus apparatus according to claim 6, wherein the computation circuit computes:
the effective focal length also based on a temperature coefficient of the lens; and
the length also based on a linear expansion coefficient.

8. The autofocus apparatus according to claim 6, wherein the computation circuit is further configured to compute the shift value based on the computed effective focal length and the computed length.

9. The autofocus apparatus according to claim 1, wherein the computation circuit utilizes the shift value and a target position to compute a corrected target position.

10. A method for determining a magnitude of position shift of two or more temperature sensitive components, comprising:
measuring an ambient temperature;
computing a first thermal response of a first temperature-sensitive component using the measured ambient temperature;
computing a first characteristic of the first temperature-sensitive component using the computed first thermal response;
computing a second thermal response of a second temperature-sensitive component using the measured ambient temperature;
computing a second characteristic of the second temperature sensitive component using the computed second thermal response; and
computing the magnitude of position shift using the computed first and second characteristics.

11. The method according to claim 10, wherein the first temperature-sensitive component comprises a lens and the second temperature-sensitive component comprises a lens barrel.

12. The method according to claim 11, wherein:
the computed first thermal response is also based on a first thermal time constant of the lens; and
the computed second thermal response is also based on a second thermal time constant of the lens barrel.

13. The method according to claim 11, wherein:
the computed first characteristic is also based on a temperature coefficient of the lens; and
the computed second characteristic is also based on a linear expansion coefficient of the lens barrel.

14. The method according to claim 10, further comprising: computing a corrected target position based on the magnitude of position shift and a target position.

15. An autofocus apparatus, comprising:
a control circuit configured to generate a drive signal;
a lens module responsive to the drive signal, wherein the lens module comprises a lens coupled to a lens barrel; and
a temperature sensor configured to measure an ambient temperature;
wherein the control circuit is further configured to:
compute a first thermal response of the lens;
compute a second thermal response of the lens barrel;
compute an effective focal length of the lens;
compute a length of the lens barrel; and
compute the drive signal according to the first thermal response, the second thermal response, the effective focal length of the lens, and the length of the lens barrel.

16. The autofocus apparatus according to claim 15, further comprising a position sensor configured to detect an actual position of the lens module, wherein the correction circuit further utilizes the actual position to compute the corrected target position.

17. The autofocus apparatus according to claim 15, wherein the drive signal is also computed based on a target position.

18. The autofocus apparatus according to claim 15, wherein:
the first thermal response is based on the ambient temperature and a thermal time constant of the lens; and
the second thermal response is based on the ambient temperature and a thermal time constant of the lens barrel.

19. The autofocus apparatus according to claim 15, wherein the effective focal length is computed based on the computed first thermal response and a temperature coefficient of the lens.

20. The autofocus apparatus according to claim 15, wherein the length is computed based on the second thermal response and a linear expansion coefficient of the lens barrel.

* * * * *